June 17, 1952
A. M. LE LAN
2,601,157
DEVICE FOR IMPARTING CONTROLLED DISPLACEMENTS
TO MACHINE-TOOL MEMBERS
Filed April 10, 1951
4 Sheets-Sheet 1
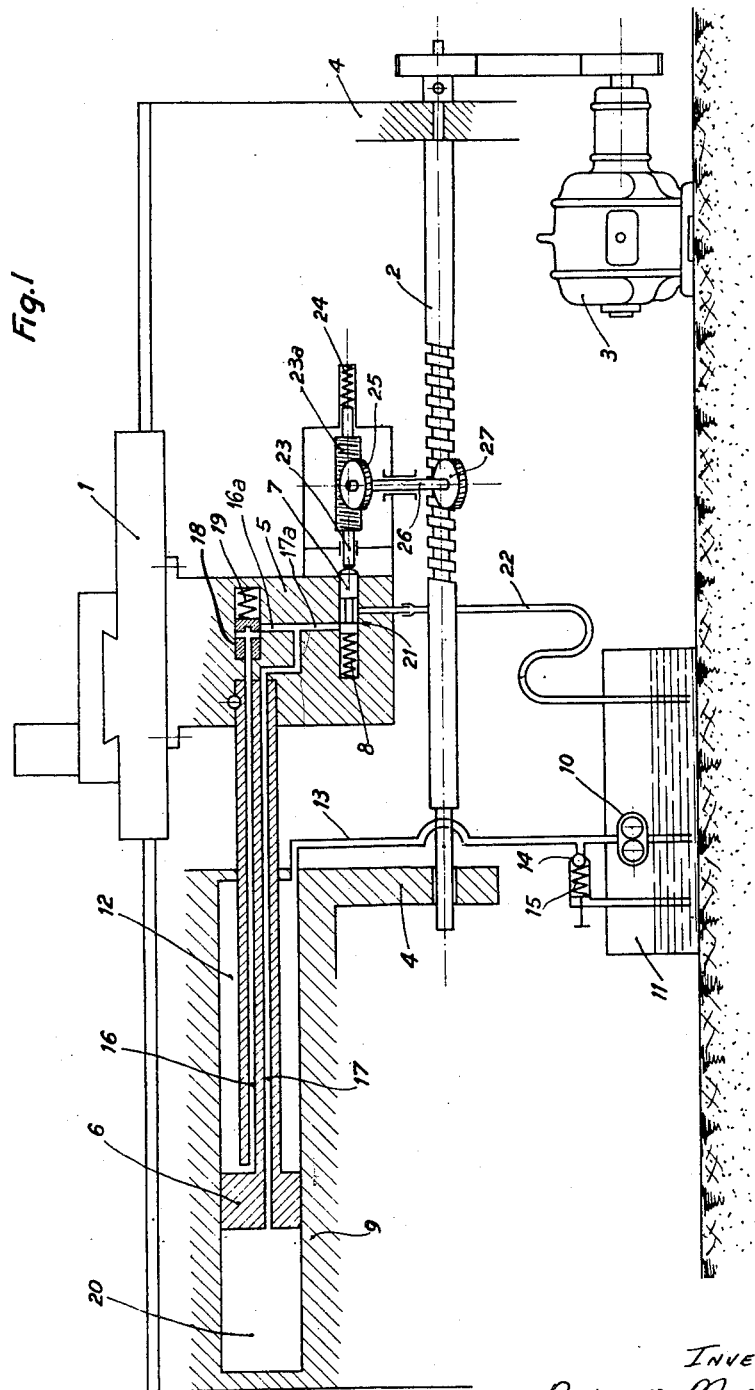
INVENTOR
ARMAND MARCEL LELAN
BY:
Haseltine, Lake & Co.
AGENTS

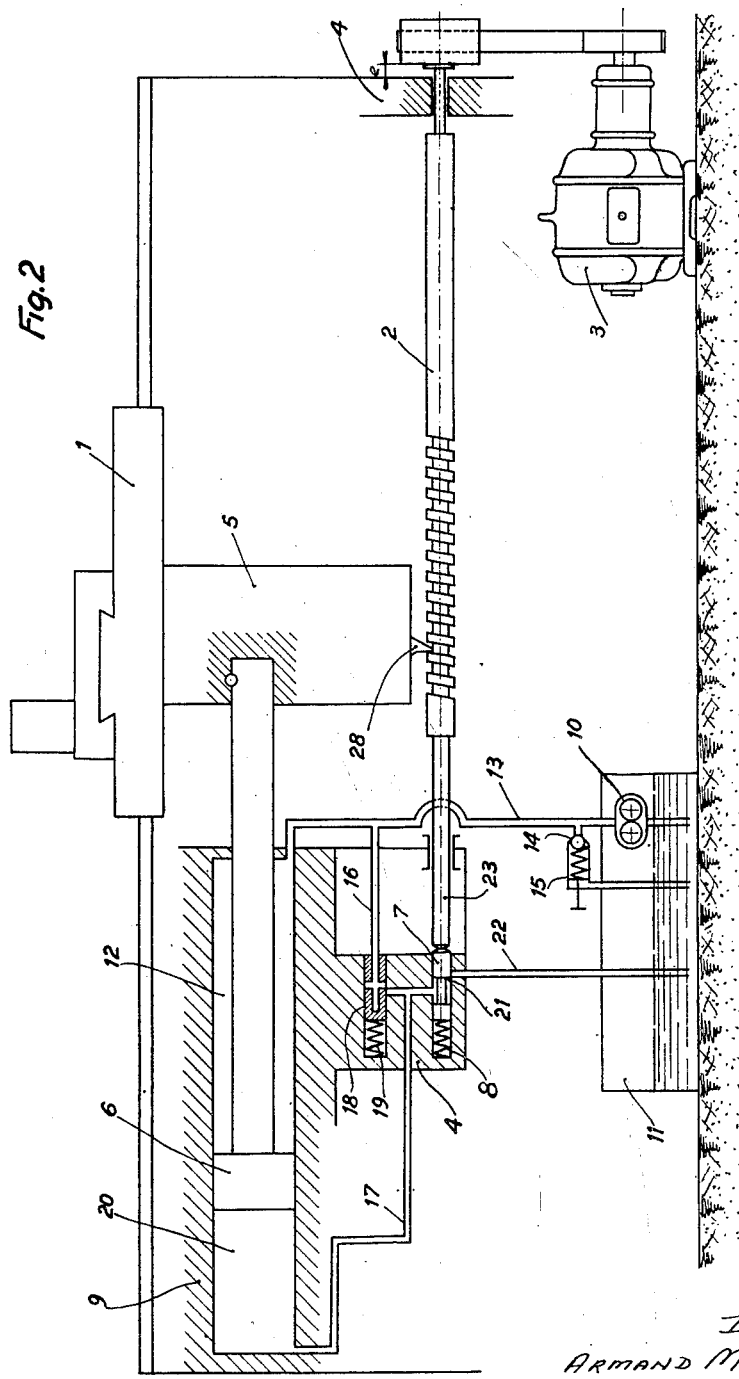

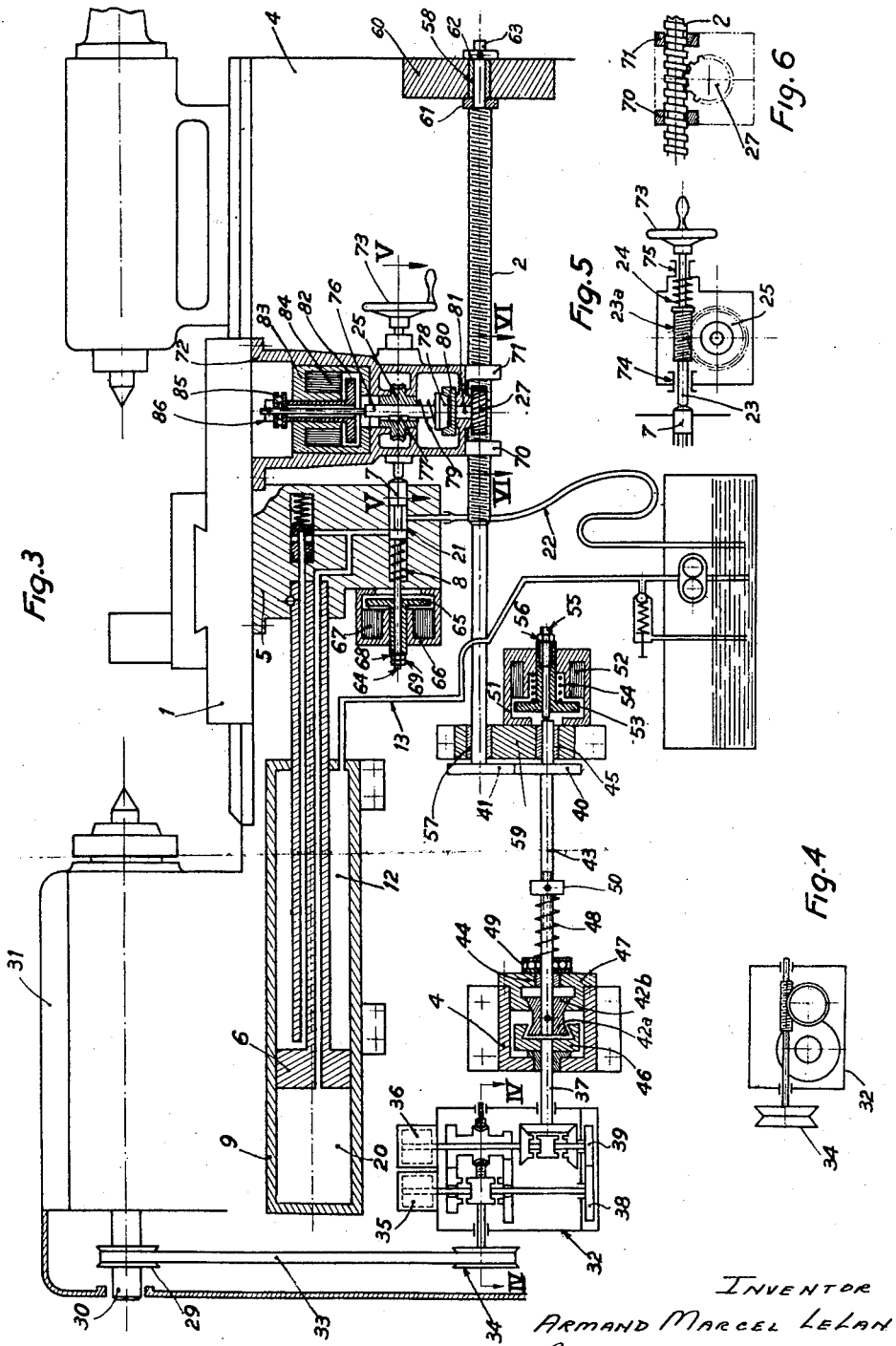

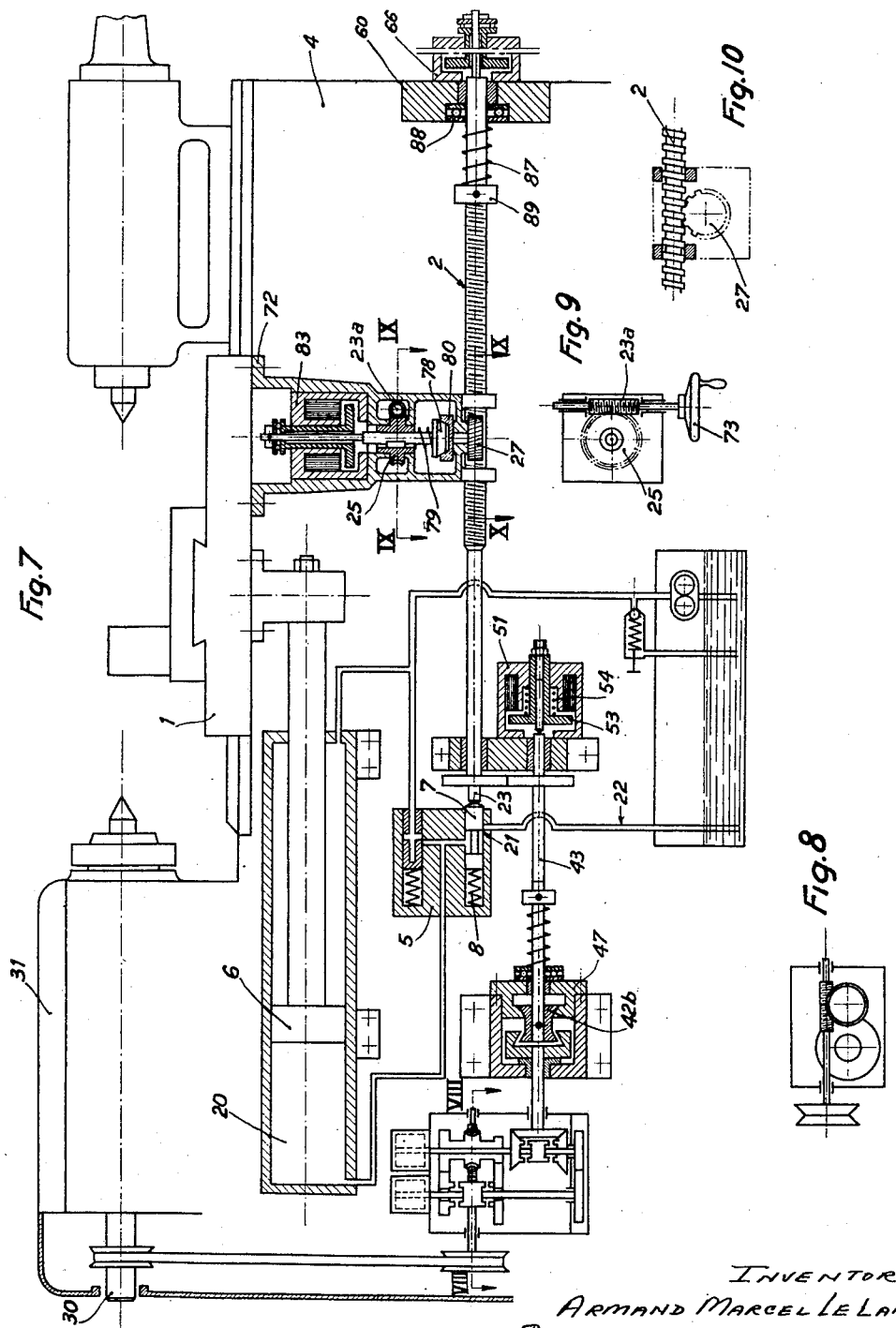

Patented June 17, 1952

2,601,157

UNITED STATES PATENT OFFICE 2,601,157

DEVICE FOR IMPARTING CONTROLLED DISPLACEMENTS TO MACHINE-TOOL MEMBERS

Armand Marcel Le Lan, Paris, France, assignor to Compagnie Generale de Construction de Locomotives (Batignolles-Chatillon), Paris, France, a corporation of France Application April 10, 1951, Serial No. 220,227
In France February 12, 1951

11 Claims. (Cl. 60—52)

This invention relates to the control of displacements of a machine-tool member, such as a tool- or workpiece-supporting carriage, according to predetermined working cycles.

It has already been suggested to control the displacements of machine-tool carriages by a hydraulic mechanism including a valve means adapted to introduce a variable restriction into a hydraulic circuit operative to produce corresponding variations in the rate of feed of the carriage, in which the positional variations of said valve means are controlled manually or automatically by means of fixed stops provided on the machine.

In known devices of this kind, the adjustment of the rate of feed, as necessitated in the first place by variations in the force required to move the carriage, and in the second place, by differences in the viscosity of the lubricant oil at different temperatures, was obtained by the use of systems using hydraulic valves of the type operating under constant pressure or under constant delivery, and controlled by the pressure-variations in the circuit, but quite independent from the feed movements of the carriage to be controlled. All such regulating systems have a serious drawback in that their action is transmitted with an appreciable delay or lag, a fact which precludes much accuracy in the feed displacements. Moreover, they are incapable of proper operation at very low velocities.

It is an object of this invention to provide a hydraulic control system of the general kind specified, which, while retaining the high power and flexibility which are the inherent characteristics of hydraulic control systems in general, is capable of controlling the feed displacements of the machine-tool member to be controlled with a degree of accuracy and a smoothness and regularity at least as high as that obtainable with the better types of mechanical feed-control systems.

More specifically, it is an object of the invention to apply to the control of the displacements of a machine-tool member, a hydraulic device of a known type which heretofore had been used exclusively as a high-precision reproducer device for machine-tools, and which is essentially characterised in that the hydraulic fluid is in permanent circulation, the displacements of the carriage being continuously controlled by the metered restriction of an orifice interposed in the said circuit, such metered restriction acting to modify the pressure exerted by the fluid on the piston controlling the carriage. The means used to regulate the variable restriction consists of a valve member acting as a feeler, in constant engagement with the contour of a copying templet or the like.

According to this invention, the feeler valve member is made to cooperate in a similar manner with the thread contour of one of the threads of a lead-screw extending parallel to the displacements of the carriage, and driven in rotation by mechanical means, e. g. from the spindle of a slide-lathe or the like. Thus, any disturbance in the smooth feed motion of the carriage, as may be caused by an increase or a decrease in the resistance opposed to such feed motion, is instantaneously translated as an alteration in the reactions exerted by the threads of said lead-screw against the feeler, and, hence, as a slight compensatory displacement of the feeler in a direction adapted to alter the rate of supply of the oil in the sense required to restore the hydraulic pressure to the requisite value for the feed of the carriage.

In one aspect of the invention, the feeler is arranged for movement with the carriage, and in this case the lead-screw is fixed in axial position; the feeler may then react on the screw-thread either directly or through the medium of a suitable transmission mechanism.

In a second aspect, the feeler is generally stationary relatively to the frame, and the lead-screw is then capable of slight axial displacements, while the feeler reacts on the screw-threads through the medium of the screw itself which takes support against a fixed point of the carriage.

In either case, the automatic control device of the invention is desirably combined with suitable clutching means allowing manual as well as automatic control and accelerated feed movements to be effected, especially for rapid advance and return movements.

The invention will be fully understood as a result of the ensuing description, relating to two practical embodiments of the invention respectively conforming to each of the above-defined aspects thereof, the practical embodiments selected for description and illustration being merely exemplary and in no way restrictive of the invention's scope. In the drawings:

Fig. 1 is a hydraulic circuit diagram illustrating the basic principle of operation of the invention in its first aspect wherein the feeler is movable with the carriage to be controlled;

Fig. 2 is a similar diagram relating to the second above-defined aspect wherein the feeler is fixed in its general position relatively to the frame;

Figs. 3 to 6 illustrate a practical embodiment of the aspect of the invention defined in Fig. 1, as applied to the control of the longitudinal traversing displacements of a lathe-carriage structure along the main dimension of the machine-tool bench; the traversing movements in the other, perpendicular, direction of the upper carriage may be controlled manually, or more preferably automatically e. g. by a reproducing control system; therein Fig. 3 is a general elevational view partly in section; while Figs. 4, 5 and 6 are fragmentary sectional views respectively on the lines IV—IV, V—V and VI—VI of Fig. 3;

Figs. 7 to 10 show an analogous embodiment of the aspect of the invention defined in the basic diagram of Fig. 2; therein Fig. 7 is a view generally similar to Fig. 3, while Figs. 8 to 10 are fragmentary sections respectively on the lines VIII—VIII, IX—IX and X—X of Fig. 7.

Referring first to the diagram of Fig. 1, a machine-tool carriage 1 is to be displaced parallel to the axis of a lead-screw 2 mechanically driven in continuous rotation through any suitable means, as from a separate motor-reducer assembly 3 and journalled in bearings provided on the machine frame 4. The carriage 1 is associated with a block 5 rigidly depending from it, and containing the hydraulic control unit now to be described.

This hydraulic unit, of a type generally known per se, includes a piston 6 rigidly connected with the carriage 1 through the medium of the block 5, and slidable within a cylinder 9 secured to or formed in the frame 4 of the machine.

Mounted for sliding movement in a bore formed in the block 5 is a feeler slide-valve member 7 urged outwardly of its bore by a spring 8, and described in greater detail hereafter.

A gear-pump 10 draws oil from an oil-sump 11 and discharges the oil constantly through a duct 13 into the annular space 12 defined in the cylinder 9 on the piston-rod side of the piston 6. The pressure in this annular space is retained at a constant value by means of a by-pass connection including a by-pass valve 14 balanced by a biassing spring 15. The oil from the annular space 12 may flow through duct 16 formed through the piston, a check-valve 18 urged by a biassing spring 19 and a duct 17 into the chamber 20 on the opposite side of the piston 6. It may be seen that the oil pressure in the chamber 20 is controlled by the action of the land 21 of the feeler valve 7, which is urged by its biassing spring 8 to the sealing position shown in the figure. From the valve 7 the oil may flow back into the sump through a flexible conduit 22.

According to the present invention, the feeler valve 7 cooperates with the threads of the lead-screw 2 through the medium of the following mechanism:

In axial alignment with the feeler valve 7 is a pusher member 23 axially slidable and subjected to the action of a spring 24, weaker than the spring 8 and constantly urging the pusher into engagement with the feeler 7. The rod 23 is formed with a worm 23a engaging a wormgear 25 supported on a shaft 26 journalled in the block 5 which, as already mentioned, is rigid with the carriage 1 to be controlled. Secured on the shaft 26 is a further wormgear 27 engaging the screw-threads of the lead screw 2. The feeler 7 is thus at all times subjected to axial urges in either direction as transmitted from the lead-screw 2 through the power-transmission 25, 26, 27 and the push-pull rod 23.

The device operates as follows: When the pump 10 of the hydraulic system is started, with the lead-screw motor 3 idle, oil is delivered through duct 13 into the chamber 12 and thence, as soon as the pressure in that chamber has risen to a value sufficient to urge the valve member 18 to its open position, through duct 16, check-valve 18 and duct 17 into the opposite chamber 20. As the effective area of piston 6 towards the chamber 20 is substantially larger than the effective piston area towards chamber 12, the piston 6, and with it the carriage 1 and block 5 are moved rightwards. The wormgear structure 25, 26, 27 participates in this bodily rightward displacement, causing the lower wormgear 27 thereof to roll on the threads of the stationary lead-screw 2 as it would over the teeth of a rack, and this rotation reacts through upper wormgear 25 against the worm 23a, imparting to it a reverse—leftward—axial displacement, thereby displacing the feeler valve member 7 further into its bore so that its land 21 gradually uncovers the return connection through drainage duct 22 into the sump.

This allows the oil pressure in the chamber 20 to drop off, so that the rightward movement of the piston 12 is arrested as soon as the leakage flow created from chamber 20 through ducts 17, and 22 into the sump 11 has allowed a balance to be stricken between the pressures prevailing in the chamber 20 and the annular chamber 12 against the opposite faces of the piston.

As the lead-screw 2 is set in rotation, the wormgear 27 is rotated and through the medium of the wormgear 25 and worm 23a, the push-rod 23 and feeler 7 are displaced, breaking the hydraulic balance previously established. Depending on the direction in which the lead-screw 2 is rotated, the push-rod 23 will cause displacement of the feeler valve 7 towards the left or towards the right; in the first case, the shoulder 21 of the valve member 7 will uncover the leakage connection to duct 22, the pressure at 20 will drop off, and the piston 6 with the carriage 1 will be moved towards the left, that is, in the same direction as the push-rod 23. In the second instance, the shoulder 21 of the valve member 7 urged by its spring 8 will seal off the leakage duct 22 and will raise the pressure in the chamber 20, the piston 6 and the carriage 1 will be driven towards the right, that is, again in the same direction as the initial displacement caused by the push-rod 23.

If a resistance arises against the rightward feed displacement of the carriage 1, the rotation of the shaft 26 is slowed down and its wormgear 27 is set in rotation by the threads of the lead-screw 2 which proceeds to revolve at a constant rate, so that, through the medium of wormgear 25 and worm 23a, a rightward displacement of the push-rod 23 results. The valve member 7 is thereby moved to the right, and its shoulder 21 gradually restricts the connection with the drain duct 22, thereby building up pressure within the chamber 20. This rise is pressure compensates the accidental resistance which had arisen and restores the normal state of balance.

An accidental reduction in the resistance to displacement of the carriage results in an exactly symmetrical sequence of effects, which appears superfluous to describe, again acting to restore the momentarily destroyed condition of balance.

Thus it is seen that any disturbance in the smooth feed movement of the carriage is substantially instantaneously translated as a very slight displacement of the feeler valve member 7, operative to correct the thrust exerted on the carriage in the appropriate manner.

If the motor 3 of the lead-screw 2 is stopped, the pressure balance on the opposite sides of the piston 12 is immediately restored, as previously described, and the carriage 1 is stopped quasi-instantaneously.

The aspect of the invention diagramatically illustrated in Fig. 2 will now be described. The hydraulic device with its feeler valve 7 and its active shoulder 21, herein, is mounted in the frame 4 of the machine rather than in a block integral with the movable carriage. The return conduit 22 can thus be provided fixed and the conduits 16 and 17 do not require to be formed through the body of the piston 6. The valve member 7 with its feeler tip can then be made to act directly on the lead-screw 2 the adjacent end of which is formed as a pusher 23 co-operating with the feeler tip 7. For this purpose, the lead-screw is mounted for slight axial displacement, as indicated at e, in a manner similar to the way in which the push-rod 23 was mounted in the embodiment of Fig. 1. The reaction on the threads of the lead-screw is then exerted directly, the screw-threads being engaged by a finger 28 rigid with the movable carriage 1.

The operation of this variant of the invention is very similar to that just described. As soon as the pump 10 of the hydraulic system is started, a pressure balance in the cylinder 9 is set up for a position of the carriage in which the pusher 23 is in engagement with the feeler 7. When, thereupon, the lead-screw 2 is started in rotation, it acts to displace the feeler in a direction corresponding with the displacement of the carriage, owing to its engagement with the finger 28. In the event of a resistance to the rightward displacement, for example, the reaction of the screw-threads against the finger 28 tends to urge the screw leftwards, depressing the feeler 7 into its bore and thereby generating a pressure surge or rise in the chamber 20, this creating an additional thrust capable of overcoming such resistance to the displacement of the carriage. Thereupon balance is restored as in the previously-discussed instances.

Each of the above-described variantes of the invention, as functionally illustrated in Figs. 1 and 2, will now be described in their practical application to mechanism controlling the longitudinal displacements of a lathe-carriage structure, together with auxiliary control means for manual control and rapid displacements.

As shown in Figs. 3 to 6, a lathe is provided with a drive pulley 29 keyed on the rear end of the spindle 30 of the headstock 31 which drives in rotation, through a transmission belt 33 and a receiver pulley 34, a mechanical feed-control gearing generally designated 32, having the pulley 34 keyed on its inlet shaft. Two electromagnets 35 and 36, arranged outside and adjacent to the casing of the gearing 32 respectively serve to control a fixed-ratio reducer gearing, and a reverser gearing adapted to reverse instantaneously the direction of rotation of the outlet shaft 37, both said gearings being contained in the box 32. The gears 38 and 39 of said gearings are interchangeable, thus allowing the rate of feed to be adjusted in a desired range.

The feed-control output shaft 37 is coupled with the lead-screw 2 through the medium of an electrically-controlled brake-clutch and a pair of meshing gears 40, 41. The brake-clutch consists of a dual male cone member 42a—42b secured on a shaft 43 slidable in bearings 44, 45 between two positions, in one (driving position) of which the male cone member 42a frictionally engages a female cone 46 rigid with the shaft 37 to be driven therefrom, and in the other (blocking position) of which the male cone member 42b engages a fixed female cone 47 rigid with the frame 4 to be blocked. A spring 48 mounted on the shaft 43 and rotatable therewith, is abutted at one end on a ball-thrust bearing 49 applied against the fixed cone 47 and at the other end, on an adjustable threaded ring or nut 50 mounted on a threaded intermediate section of the shaft 43. In the absence of any axial stress exerted on the shaft 43, the spring 48 acts to maintain the male cone member 42a in engagement with the female cone 46 in the "drive" position thereof.

Beyond the end of and coaxially with the shaft 43 there is an electromagnet casing 51 secured to the frame of the machine and containing a winding 52. A core 53 urged by a spring 54 more powerful than the spring 48 acts, in the deenergized condition of the magnet, to urge the shaft 43 to its "block" position illustrated in the drawing, through the medium of an adjusting screw 55 screwed into the core 53 and blockable in its adjusted position by a lock-nut 56.

The lead-screw 2 is freely journalled in bearings 57 and 58 supported on fixed supports, 59, 60 rigid with the frame. The axial reactions of the lead screw are taken up, within the support 60, by a washer 61 and a cottered ring 62 secured on the end 63 of the lead-screw which is journalled in the bearing 58.

The hydraulic control system is entirely similar to that described in connection with Fig. 1, and requires no further description.

In alignment with the feeler member 7 and integral therewith there is a stem 64 extending through the core, formed with a flange 65, of an electromagnet 66 secured on the hydraulic block 5. When the winding 67 of this electromagnet is energized as hereinafter described, the core 65 is attracted and acts upon the stem 64 through nut and locknut 68—69, adjusted and blocked in adjusted position on the end of said stem to draw the feeler leftwards thus opening the valve 7 and imparting its neutral condition to the hydraulic control system.

A manual and automatic positional control device is secured below the carriage 1, in a manner similar to the hydraulic block 5. This unit essentially comprises a wormgear 27 retained constantly in meshing engagement with the lead-screw 2 in bearings 70 and 71 rigid with the support 72 (Fig. 6).

A worm 23a having a sufficiently long pitch to be irreversible (Fig. 5) has its centre axis of rotation coincident with the centre of the feeler 7 and is manually controllable by a hand-wheel 73; the worm meshes with a wormgear 25 rotatable in the support 72. The worm 23a is freely slidable and rotatable in the bearings 74 and 75 of the support 72. A spring 24 substantially weaker than the spring 8 urges the end 23 of the worm 23a into engagement with the feeler 7.

In axial alignment with the wormgear 25 a shaft 76 connected for rotation with the wormgear 25 by a key 77 is freely slidable. The lower end of the shaft 76 is provided with a male cone member 78 urged by a spring 79 into driving engagement with a female cone member 80, provided on the upper end of a stub-shaft 81 journalled in the support 72 and having the wormgear 27 keyed on its lower end.

The shaft 76 at its upper end extends through the flanged core member 82 of an electromagnet 83 fitted in the support 72. Energization of the winding 84 of this magnet 83 is adapted to raise the core member 82 and thus, through the ball-thrust bearing 85 and cottered ring 86 rigid with the shaft 76, to raise the male cone member 78 against the pressure of the spring 79 away from the female cone 80.

The structure thus described operates as follows: With the machine idle, and all electric circuits broken, all of the described electromagnets are deenergized, accordingly the condition of the various component units of the mechanism is as follows:

The core 53 of magnet 51 urged by spring 54 has actuated shaft 43 to engage male cone 42b with female cone 47 as shown, thus preventing any rotation of the lead-screw 2.

In the positional control unit, the cones 78 and 80 are pressed into mutual engagement by the spring 79, thus connecting the wormgears 27 and 25 for rotation in unison.

Finally, in the hydraulic unit 5, deenergization of the magnet 67 allows the spring 8 to maintain the feeler valve member in the position in which it seals the return path for the oil from the cylinder chamber 20 into the sump by means of its shoulder or land 21.

Upon the hydraulic pump being started, a pressure balance is struck in the hydraulic circuit between the opposite sides of the piston 6 as previously described in connection with the basic diagram of Fig. 1. The machine is then conditioned for operation. Upon the lathe-spindle 30 being clutched in, the outlet shaft 37 of the feed-control assembly 32 is rotated, in a direction and at a speed as determined by a preliminary selective energization of the magnets 35 and 36 and by the relative diameters of the interchangeable meshing gears 38 and 39 inserted in the feed control gearing. However, the automatic feed drive path still remains broken owing to the declutched conditions of the cones 46, 46a.

Magnet 51 is then energized. Winding 52 attracts core 53 and thus releases shaft 43, which is urged by the spring 48 to disengage the pair of blocking cones 42b, 47, and engage the pair of drive cones 46, 42a, thus connecting the shaft 43 for rotation with shaft 37.

The lead-screw 2, now driven in rotation through the gearing 49—41, takes support against its end thrust bearing 60, while it drives in rotation the wormgear 27 and consequently imparts the desired feed motion to the carriage in the manner previously described.

The use of a lead-screw for imparting feed displacements to a carriage does not allow the possibility of altering at will the speed of displacement of the carriage during a given cycle, aside from the fixed ratios provided by the selective energization of the magnets 35 and 36 of the box 32. Accordingly, the delivery rate of the pump 10 is so selected that any feed rate within the range of normal operating feed rates can be achieved with a moderate value of the restriction produced by the valve 7, rapid feed rates in either direction being obtained at will by bringing said valve to its fully sealed, or fully open, position respectively. Thus, to obtain for instance a rapid return motion of the carriages towards the right of the drawing, the magnet 83 in support 72 is energized, which relieves the cones 78 and 80 from the blocking pressure of spring 79, and imparts a freely-rotatable condition to the worm-gear 27. The valve 7 is then urged by the spring 8 to seal the connection with port 22 completely, and the pressure rises in 20, quickly driving the piston and the carriage rightwards.

If on the other hand it is desired to produce a rapid advance movement, the magnets 83 and 66 are both energized. Energization of magnet 83 serves the purpose as in the previous instance, of allowing the gear 27 to rotate freely along the lead-screw 2. Energization of magnet 66 drives the valve 7 backwards, against its spring 8 and fully opens the drainage connection 22. The pressure in 20 drops off completely, causing a rapid advance of the piston 6 and the carriage 1 towards the headstock 31.

The arrangement described hereinabove finally permits of manually displacing the carriage 1 when desired. For this purpose magnets 66 and 83 are deenergized so that the cones 78 and 80 are engaged, whereby rotation of the handwheel 73 in either direction will cause the worm 23a to revolve in the corresponding direction, exerting thrust on the lead-screw 2 through the medium of the two wormgears 25 and 27, and hence the worm 23a and pusher 23 will advance or recede, resulting in a corresponding displacement of the valve 7.

In the same way as in the automatic feed operation previously described, a constant pressure exerted by pusher 23 on valve 7 owing to a steady manual rotation of the handwheel 73, will necessarily result in a smooth and regular movement of the carriages, and upon such manual rotation being stopped, the carriages will immediately be arrested in their motion owing to the immediate establishing of a pressure balance between the hydraulic pressures acting on the opposite sides of the piston.

The embodiment illustrated in Figs. 7 to 10 will now be described, this embodiment being based on the fundamental diagram shown in Fig. 2. Accordingly, therein, the hydraulic unit 5, rather than being rigid with the movable carriage 1, is rigid with the frame 4, and so is stationary, thereby eliminating all movable and flexible hydraulic connections, such connections being now formed in the body of the frame.

The movements of the feeler valve member 7 are now controlled directly from the lead-screw 2, which is capable of slight axial displacements, rather than being controlled through a separate pusher member 23 carried by a support 72 movable with the carriage, as in the first embodiment. The electro-magnet 66, which by its function corresponds with the similarly-referenced magnet in Fig. 4 controlling the rod 64 and valve 7, is herein located at the outer end of the lead-screw 2. Moreover, a spring 87 substantially stronger than spring 8, acts between a ball-thrust bearing 88 provided in the end-support 60 for the lead-screw, and a ring 89 rigid with the lead-screw, to urge the lead-screw towards the feeler 7 in the absence of any opposing force.

The hydraulic mechanism is essentially the same as that described in connection with the basic diagram of Fig. 2.

The operation of this modification of the invention will now be described:

When the machine idles, all electric supply circuits open, the magnets are deenergized, and consequently the core 53 of magnet 51 is actuated by its spring 54 to shift the shaft 43 into a position in which the cone members 42b and 47 are in engagement, preventing any rotation of the lead-screw 2.

In the positional control unit 72, the cones 78 and 80 are pressed into enggagement by the spring 79, preventing any rotation of the gear 27 owing to the irreversible character of the worm and wormgear drive 25—23a. The gear 27 thus blocked against rotation therefore serves the function of the finger 28 rigid with the carriage as shown in the diagram of Fig. 2. The spring 87 at the end of the lead-screw 2 has acted to apply the lead-screw against the feeler 7, so that the feeler valve land 21 has fully sealed the return or drain port 22.

Upon the pump being started, the components assume a position in which the pressures acting on the opposite sides of the piston 6 balance each other, as previously described for Fig. 2. The power-paths for the mechanical feed drive from the spindle 30, and the rotation of the lead-screw 2, are clutched in as previously described. The lead-screw 2 exerts a thrust on the fixed gear 27 as it did on the finger 28 in Fig. 2, and depresses or releases the valve member 7 imparting corresponding feed movements to the carriage.

To impart a rapid return movement to the carriages towards the end support 60, the electromagnet 83 in support 72 is energized, thus disengaging the cone clutch 78—80 and rendering the gear 27 freely rotatable. The lead-screw 2 is then urged by the spring 87 to actuate the feeler-valve 7 to its fully sealing position, raising the pressure in chamber 20, and thereby driving the piston 6 and carriage 1 towards the end-support 60 at a rapid rate. Moreover, if the magnets 83 and 66 be energized simultaneously, the lead-screw 2 is attracted by the magnet 66 away from the feeler 7, and allows the feeler to be actuated by its spring 8 to its projected position in which it fully uncovers the drain duct 22. The oil pressure then drops off completely in the chamber 20, resulting in a rapid advancing movement of the piston 6 and carriage 1 towards the headstock 31.

As stated, the feed-control arrangement described also provides for manual operation of the carriage. For this purpose, magnet 83 is deenergized and the cone-clutch 78—80 is therefore engaged, so that any rotation manually imparted to handwheel 73 in either direction is operative, through the worm 23a and wormgear 25, to rotate the gear 27 and impart axial displacement to the lead-screw in a corresponding direction.

The feeler valve member 7, urged into following engagement with the lead-screw by its spring 8, responds to such axial displacements of the lead-screw correspondingly to increase or reduce the return oil flow through duct 22, and thus reduce or increase the oil pressure in chamber 20, thereby driving the piston and carriage in a corresponding direction.

Just as in the case of automatic feed movements, constant pressure exerted on the lead-screw 2 by a steady rotation of the hand-wheel 73 necessarily brings about a steady, uniform displacement of the carriages; upon the rotation of handwheel 73 being arrested, the carriage is immediately brought to a stop owing to an automatic balance being at once set up between the pressure values on the opposite sides of the piston.

It will be understood that, while the various clutch means provided for selecting the various types of operation of the device, directions and rates of carriage displacements, etc., were described and illustrated as being of the electromagnetically operated type, this of course is by no means essential, and such clutches may be of the mechanical, hydraulic, or other type, or they may be manually operated rather than automatic.

Various other variations in the structural details disclosed in either of the forms of embodiment shown by way of example may be made without exceeding the scope of the invention.

What I claim is:

1. In a machine comprising a frame member and a member movable relatively thereto, a lead-screw journalled in the frame member parallel to the displacements of the movable member and means for rotating said lead-screw, a hydraulic cylinder in the frame and a piston rigid with the movable member and slidable in the cylinder and defining therein opposite chambers, the effective piston area being smaller in one chamber than in the other, a hydraulic fluid supply, delivery connections from the supply to each cylinder chamber and a pump adapted to constantly feed fluid from the supply through the delivery connections to both chambers, a valve chamber in one of said members and a drain connection from a first one of said cylinder chambers to the valve chamber and thence to the supply, a valve member reciprocable in said valve chamber in directions parallel to said displacements and controlling said drain connection, a feeler integral with the valve member, reacting means movable with the movable member and reacting against the threads of the lead-screw and providing together with the lead-screw a pair of cooperating elements of which the reacting element is associated with the movable member and the lead-screw element is associated with the frame member, that one of said elements which is associated with the said one member being mounted for slight yielding displacements relatively to said one member parallel to said common direction, and means urging the feeler into axial contact engagement with said one element, an increasing reaction thrust against said one element causing said one element to be slightly yieldingly displaced in the direction which causes the feeler and the valve member to be moved in the direction controlling the drain connection to increase the relative pressure in that one of said cylinder chambers in which a pressure increase will be effective to overcome such increased reaction.

2. In a machine comprising a frame member and a member movable relative thereto in one and in an opposite axial direction, a lead-screw journalled in the frame member parallel to said axial directions and means for rotating the lead-screw, a hydraulic cylinder in the frame member and a piston slidable therein and rigid with the movable member and defining opposite chambers in the cylinder the effective piston area being larger in one chamber than in the other, a hydraulic fluid supply, delivery connections from the supply to each cylinder chamber and a pump constantly feeding fluid from the supply through the delivery connections to both chambers, a valve chamber in one of said members and a drain connection from said one chamber through the valve chamber to the supply, a valve member reciprocable in said valve chamber parallel to said axial directions and controlling said drain connection to restrict it when the valve member is displaced in said opposite axial direction, a feeler integral with the valve member, reacting means movable with the movable member and reacting against the threads of the lead-screw when the movable member is moving in said one axial direction and providing together with the lead-screw a pair of cooperating elements of which the reacting element is associated with the movable member and the lead-screw element is associated with the frame member, that one of said elements which is associated with the said one member being mounted for slight yielding axial displacements relatively to said one member, and spring means urging the feeler into axial contact engagement with said one element, an increasing reaction thrust between said elements causing said one element and hence said feeler and valve to be slightly displaced in the said opposite direction to restrict said drain connection.

3. The arrangement claimed in claim 2 wherein said one member is the movable member and said one reacting element associated with said one member comprises a pusher rod mounted for slight yielding axial displacements relative to the movable member and axially engaging said feeler, and a gearing connection from said lead-screw to said push-rod.

4. The arrangement claimed in claim 3 which further includes a clutch interposed in said gearing connection.

5. The arrangement claimed in claim 3 wherein the gearing connection comprises a worm integral with the pusher, and a coaxial integral pair of wormgears journalled in the movable member and respectively meshing with the lead-screw and with the worm.

6. The arrangement claimed in claim 2 wherein said one member is the frame and said one element associated therewith is the lead-screw, said lead-screw being mounted for slight yielding axial displacements relatively to the frame and being in end contact engagement with said feeler, and the other reacting element comprises means movable with the movable member.

7. The arrangement claimed in claim 2 wherein said one member is the frame and said other reacting element is releasably connected with the movable member.

8. The arrangement claimed in claim 2 which further comprises manual means for axially displacing the said one element relative to said one member for adjusting the mean value of said reaction.

9. The arrangement claimed in claim 2 wherein said one member is the frame and said one element is the lead-screw, and the other reacting element comprises a wormgear journalled in the movable member and meshing with the lead-screw.

10. The arrangement claimed in claim 2 wherein said pair of reacting elements includes a wormgear meshing with the lead-screw and journalled on the movable member, and means for manually rotating said wormgear.

11. The arrangement claimed in claim 2 wherein said one member is the frame and said one element the lead-screw, and said other reacting element is a finger rigidly connectable with the movable member.

ARMAND MARCEL LE LAN.

No references cited.